United States Patent [19]

Fischbeck

[11] 4,379,301

[45] Apr. 5, 1983

[54] METHOD FOR INK JET PRINTING

[75] Inventor: Kenneth H. Fischbeck, Dallas, Tex.

[73] Assignee: Xerox Corporation, Stamford, Conn.

[21] Appl. No.: 304,492

[22] Filed: Sep. 22, 1981

[51] Int. Cl.³ ............................................. G01D 15/18
[52] U.S. Cl. ................................ 346/1.1; 346/140 R
[58] Field of Search ................ 346/140 R, 75, 139 R, 346/1.1; 400/126

[56] References Cited

U.S. PATENT DOCUMENTS

| | | | |
|---|---|---|---|
| 3,136,594 | 6/1964 | Ascoli | 346/1.1 |
| 3,688,034 | 8/1972 | Kashio | 346/1.1 X |
| 3,871,004 | 3/1975 | Rittberg | 346/75 |
| 4,138,688 | 2/1979 | Heard | 346/75 |
| 4,314,282 | 2/1982 | Fischbeck | 358/286 |
| 4,322,063 | 3/1982 | Fischbeck | 267/160 |
| 4,349,828 | 9/1982 | Fischbeck | 346/1.1 |

Primary Examiner—Joseph W. Hartary
Attorney, Agent, or Firm—Richard A. Tomlin

[57] ABSTRACT

Electrostatic deflection is used to correct velocity induced droplet placement errors in an oscillating bar ink jet printer.

1 Claim, 7 Drawing Figures

METHOD FOR INK JET PRINTING

The invention relates to an oscillating bar drop-on-demand ink jet printer where printing occurs while the bar is moving bidirectionally. Specifically, the invention relates to a method of correcting drop placement errors caused by bar velocity induced droplet offset. This offset can become noticeable when the oscillating bar velocity becomes appreciable with respect to droplet velocity. Where a single figure such as a vertical line is being formed by droplets expressed while the bar is moving in both directions, this velocity offset imparted to the droplets can give the resulting character or figure a jagged appearance. This can create a print quality problem. To minimize this problem, electrostatic droplet deflection is utilized to offset the bar velocity induced droplet offset.

The foregoing advantages and features of the present invention will be apparent upon consideration of the following more particular description of a preferred embodiment as illustrated in the accompanying drawing wherein:

FIG. 2 shows how the droplets can appear on a record surface where droplet velocity offset is not compensated for.

Figure 1A:
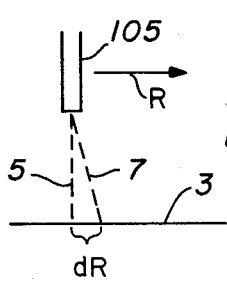
FIGS. 1A and 1B illustrate how the velocity of the moving bar causes droplet offset on the record surface.
Figure 1B:
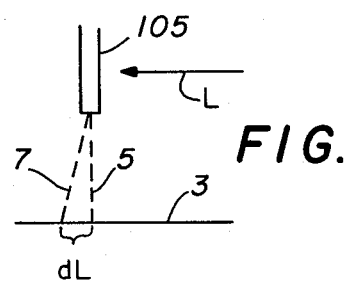

Referring now to FIG. 1A, ink jet nozzle 105 mounted on an oscillating bar (not shown) is moving in the direction shown by arrow R. When a droplet is ejected from nozzle 105 in response to an electrical signal operating on a transducer (not shown), the droplet, instead of moving directly to record surface 3 along path 5, follows a trajectory represented by line 7 resulting in offset dR because of the R direction velocity imparted to the droplet by the motion of ink jet nozzle 105. Similarly, FIG. 1B shows ink jet nozzle 105 moving in direction L resulting in offset dL. Where a single figure is produced by droplets expressed from ink jet nozzle 105 moving in both directions R and L, the resulting image will have droplets, the centers of which will be offset from each other by a distance of as much as dR plus dL.

Figure 2:
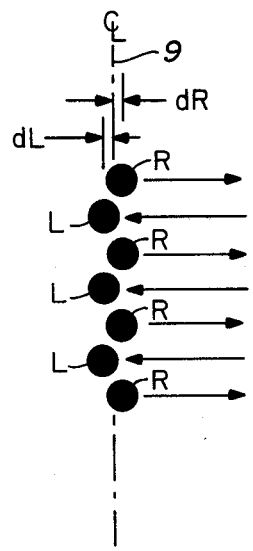

In FIG. 2, centerline 9 represents the centerline of droplet positions where they would land if there was no bar velocity induced droplet offset. It should be pointed out here that the oscillating bar of this invention oscillates at between 5 and 60 Hz. The bar velocity varies between 0 and 30 inches/second. The amount of offset is also affected by the distance between nozzle 105 and record surface 3, as can readily be understood, and the velocity at which droplets are expelled.

The droplets, where no bar velocity induced offset occurs, follow path 5, (see FIGS. 1A and 1B). Dots R, however, represent the droplet positions on record surface 3 (see FIGS. 1A and 1B) where nozzle 105 is moving in the direction R as shown in FIG. 1A when droplets are being ejected. Dots L show the position of droplets on record surface 3 (see FIGS. 1A and 1B) resulting from the direction L movement of ink jet nozzle 105 being imparted to droplets ejected from moving ink jet nozzle 105. dR and dL again represent the velocity imparted droplet offset. It can be seen that, where a single figure represented as a vertical line in FIG. 2 is formed by an ink jet nozzle printing bidirectionally, a jagged appearance can result. Of course, this velocity imparted droplet offset can be compensated for electronically by properly programming the pulse transducer controller for ink ejection. Such systems are, however, more complicated, hence more expensive and less reliable. Also, where the printer is being used in a copier mode where bidirectional printing is used, a full scan line of data must be stored and time corrected to ensure proper dot positions.

Figure 3:
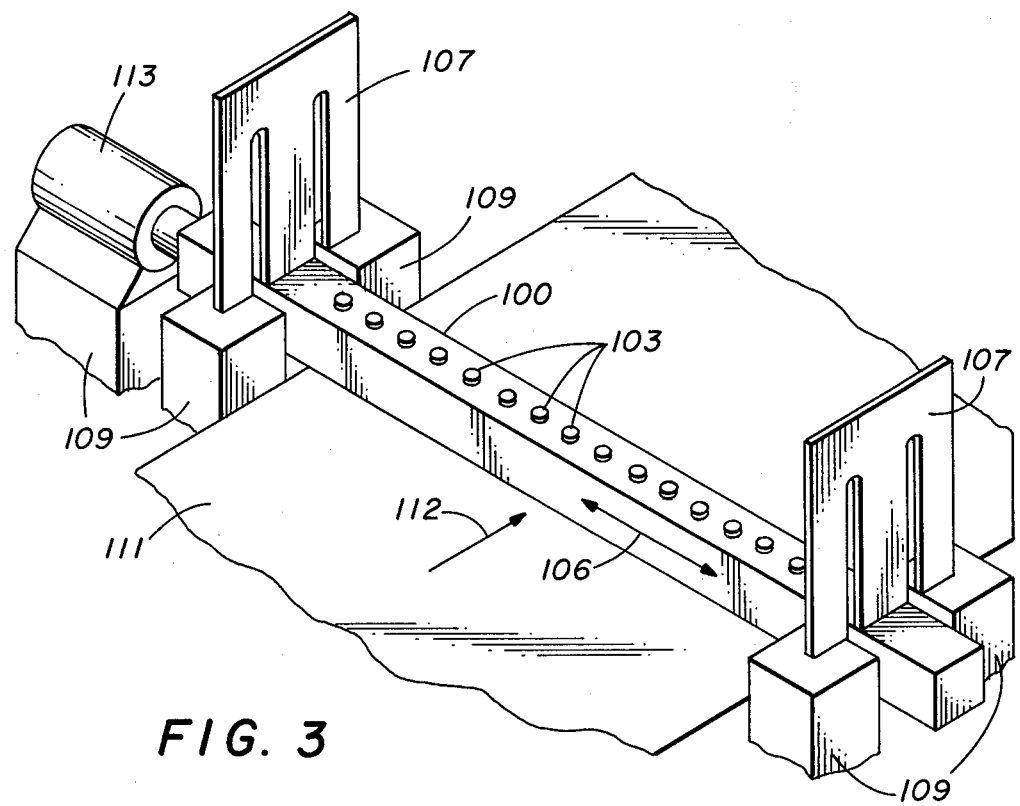
FIG. 3 is a perspective view of an oscillating bar printer in which the present invention is useful.

Referring now to FIG. 3, there is shown an oscillating bar printer. Specifically, there is shown an oscillating bar, referred to hereinafter as a raster input scan/raster output scan (RIS/ROS) support member 100, which may be, for example, of a plastic material. Supported by RIS/ROS member 100 are scanning/reading means represented here by discs 103, which may be, by way of example, photodetectors. Also supported by RIS/ROS support member 100 are marking elements 105 (see FIG. 4), which, in this exemplary instance, are drop-on-demand ink jets. Conveniently, one marking element 105 can be provided for each reading element 103; however, this is not necessary. RIS/ROS support member 100 is suspended for axial oscillatory movement in the directions shown by arrow 106 by flexure mounts 107, which act as multiple compounded cantilever springs. This double pivoting action keeps RIS/ROS support member 100 in spaced relationship to record-receiving member 111 with a minimum amount of arc over its complete travel. RIS/ROS support member 100 is oscillated by oscillating means 113, which may be, for example, a solenoid. Solenoid 113 is also fixed to base 109 as are flexure mounts 107.

Figure 4:
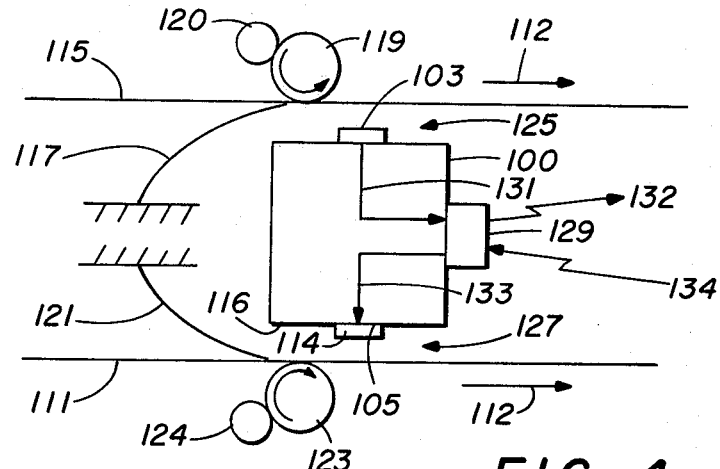
FIG. 4 is a side-sectional view of the oscillating bar printer of FIG. 3.

Referring now to FIG. 4, which is a schematic side view of the oscillating bar printer of FIG. 3 with the base 109 and flexure mounts 107 not shown for purposes of clarity. Document 115, which is to be scanned by photodetectors 103, is guided by leaf-spring fingers 117 into contact with drive guide roller means 119, which, when driven by motor 120, pulls document 115 across the reading path of photodetectors 103 through image-reading station designated generally as 125. Document 115 and roller 119 were not shown in FIG. 3 to simplify understanding of the construction of the oscillating bar printer. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Transducer controller 129 is used to receive the input signal 131 from the photodetectors 103 and to produce an output signal 133 to ink jets 105. Transducer controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between photodetectors 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronization. That is, the document and copy may be advanced together either continuously or stepwise. Preferably, the document 115 and copy sheet 111 are moved continuously because less expensive drive means and less circuitry are required than for stepwise movement. As document 115 is advanced, it is scanned by photodetectors 103, which send signals 131 to transducer controller 129. Transducer controller 129, in response to input signals 131, provides output signals 133, which trigger the appropriate ink jets 105. In this manner, a copy is formed on sheet 111 corresponding to the document 115. Obviously, signals 131 could be provided from a remote source, for example, facsimile or computer devices in which case photodetectors 103, document 115 and associated document feed apparatus would not be activated or required.

Figure 5:
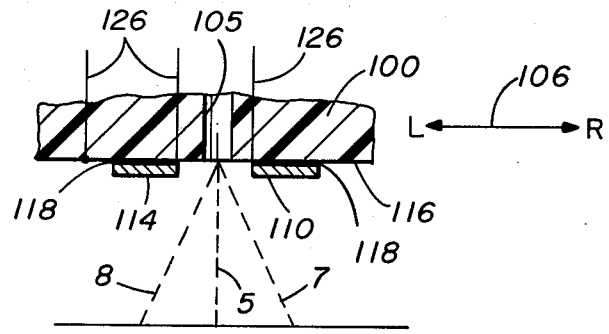
FIG. 5 is a partial side-sectional view of the oscillating bar showing the present invention in greater detail.
Figure 6:
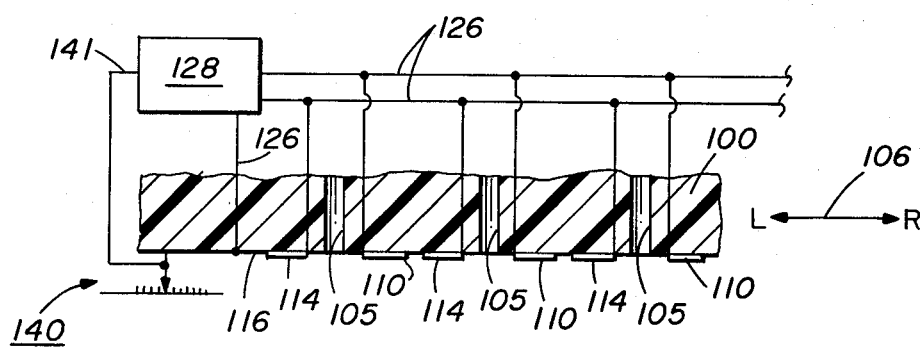
FIG. 6 is a partial side-sectional view of the oscillating bar of FIG. 3 showing the electrostatic deflection means and velocity and direction sensor and control means.

Referring now to FIGS. 5 and 6, there is shown a partial side-sectional view representing a portion of RIS/ROS support member 100. Ink jet nozzle 105 expels droplets through conductive faceplate 116 formed on the ink jet nozzle side of RIS/ROS support member 100. Electrostatic deflection electrodes 110 and 114 are mounted on RIS/ROS support member 100 between ink jets 105 as shown in FIG. 6. That is, the ink jets 105 and electrodes 110 and 114 are aligned parallel to the long axis of RIS/ROS support member 100. Insulating material 118 (see FIG. 5) is placed between the electrodes 110, 114 and the conductive faceplate 116. Faceplate 116 and electrodes 110 and 114 are connected by electrical leads 126 to source of potential and electrode controller 128. When the RIS/ROS support member 100 is oscillating to the right as seen in FIGS. 5 and 6, droplets emitted from droplet ejector nozzle 105 follow a line of travel to the right represented by line 7. To offset this bar velocity induced droplet offset, an electrical potential is applied between electrode 114 and faceplate 116. This potential difference causes the droplets to be deflected in a direction represented by line 8. That is, if the RIS/ROS support member 100 were standing still at the time a droplet were ejected, and if electrode 114 were activated, the droplet would follow a path represented by line 8. Optimally, path 8 and path 7 are such that the resultant becomes path 5. Since the velocity of RIS/ROS support member 100 varies from 0 to $V_{max}$ and back again with each oscillation cycle, and since the direction changes from L to R for each oscillation cycle, it is necessary not only to alternate the electrode that is being activated, but the amount of potential applied should also be varied. More particularly, as RIS/ROS support member 100 moves to the right as seen in FIGS. 5 and 6, the velocity of the RIS/ROS support member 100 throws the drop ahead as represented by line 7 in FIG. 5. To minimize this RIS/ROS support member velocity induced droplet offset, electrodes 114, that is, the trailing electrodes, are activated to deflect the droplets back or to the left (as shown in FIGS. 5 and 6) along a line represented as 8. The resultant should approximate line 5. Similarly, when RIS/ROS support member 100 is moving to the left, electrodes 110, now the trailing electrodes, are activated. It can be seen that, because the velocity of RIS/ROS support member 100 varies from $V_o$ when RIS/ROS support member is at either extreme of its oscillation and increases to $V_{max}$ at the center point of its oscillation, it is necessary to accordingly vary the potential applied between electrodes 110, 114 and conductive faceplate 116. As an example, if a droplet is ejected when RIS/ROS support member is at the extreme left position of its travel, and the velocity is near $V_0$, little, if any, velocity induced droplet offset occurs; hence little, if any, potential need be applied. As the RIS/ROS support member 100 accelerates to the right and gains velocity, velocity induced droplet offset increases requiring that a greater potential be applied between electrodes 114 and faceplate 116. For best results, it is desirable to provide a linear encoder shown generally as 140 in FIG. 6 to determine the direction of travel and the velocity of RIS/ROS support member 100. The direction of travel and velocity information derived from the linear encoder 140 is transmitted by line 141 to electrode controller 128. Electrode controller 128 reads the linear encoder input signal and controls the potential applied to lines 126 and hence to electrodes 114 and faceplate 116 or electrodes 110 and faceplate 116 depending on the direction of travel of RIS/ROS support member 100 and the amount of potential depending on RIS/ROS support member velocity.

Although specific components have been disclosed herein, many modifications and variations will occur to those skilled in the art. Such modifications and variations are intended to be included within the scope of the appended claims.

What is claimed is:

1. A method of correcting velocity induced droplet placement errors in an oscillating bar drop-on-demand ink jet printer, which comprises:
   providing a row of drop-on-demand ink jet ejectors on a bar parallel to the long axis of said bar;
   providing a first and a second electrode, one on either side of each of said ink jet ejectors, and positioned between said ejectors in a line parallel to the long axis of said oscillating bar;
   providing direction and velocity sensor means for sensing the direction and velocity of movement of said bar; and
   providing direction and velocity control means responsive to said direction and velocity sensor means to control the application of electrical potential to the trailing electrode of said first and second electrodes to substantially completely compensate for velocity induced droplet placement error.

* * * * *